US012427963B2

(12) United States Patent
Brenn et al.

(10) Patent No.: US 12,427,963 B2
(45) Date of Patent: Sep. 30, 2025

(54) BRAKING SYSTEM HAVING A REDUNDANT PARKING BRAKE FUNCTION

(71) Applicant: Continental Automotive Technologies GmbH, Hannover (DE)

(72) Inventors: Martin Brenn, Mainz (DE); Roman Büchler, Frankfurt (DE); Thorsten Ullrich, Gernsheim (DE)

(73) Assignee: Continental Automotive Technologies GmbH, Hannover (DE)

( * ) Notice: Subject to any disclaimer, the term of this patent is extended or adjusted under 35 U.S.C. 154(b) by 546 days.

(21) Appl. No.: 17/905,508

(22) PCT Filed: Dec. 14, 2020

(86) PCT No.: PCT/EP2020/086010
§ 371 (c)(1),
(2) Date: Sep. 2, 2022

(87) PCT Pub. No.: WO2021/175477
PCT Pub. Date: Sep. 10, 2021

(65) Prior Publication Data
US 2023/0294650 A1    Sep. 21, 2023

(30) Foreign Application Priority Data
Mar. 6, 2020  (DE) .................. 10 2020 202 920.2

(51) Int. Cl.
*B60T 13/58*   (2006.01)
*B60R 16/03*   (2006.01)
(Continued)

(52) U.S. Cl.
CPC ........ *B60T 13/588* (2013.01); *B60R 16/0315* (2013.01); *B60T 8/171* (2013.01);
(Continued)

(58) Field of Classification Search
CPC ........ B60T 13/588; B60T 8/92; B60T 17/221; B60T 8/885; B60T 8/17616; B60T 8/171;
(Continued)

(56) References Cited

U.S. PATENT DOCUMENTS 9,873,414 B2 *   1/2018   Förster .................... B60T 7/122
10,363,913 B2 *  7/2019   Besier .................... B60T 13/741
(Continued)

FOREIGN PATENT DOCUMENTS

CN   101954904 A   1/2011
CN   103167976 A   6/2013
(Continued)

OTHER PUBLICATIONS

German Patent No. DE 102011110892 to Fendt published on Feb. 7, 2013.*
(Continued)

*Primary Examiner* — Pamela Rodriguez

(57) ABSTRACT

A braking system for a motor vehicle has a plurality of hydraulic brake units for braking each braking one wheel of the motor vehicle and a first electric parking brake actuator for braking a first wheel and a second electric parking brake actuator for braking a second wheel. A first control device comprises a first hydraulic controller which is designed and set up to drive the plurality of hydraulic brake units. In order to ensure parking brake redundancy, the first control device has a driver for driving the first parking brake actuator. A second control device is also provided, which comprises a driver for driving the first parking brake actuator and a driver for driving the second parking brake actuator.

20 Claims, 3 Drawing Sheets

(51) Int. Cl.
  *B60T 8/171* (2006.01)
  *B60T 8/1761* (2006.01)
  *B60T 8/88* (2006.01)
  *B60T 8/92* (2006.01)

(52) U.S. Cl.
  CPC .......... *B60T 8/17616* (2013.01); *B60T 8/885* (2013.01); *B60T 8/92* (2013.01); *B60T 2240/00* (2013.01); *B60T 2270/10* (2013.01); *B60T 2270/402* (2013.01); *B60T 2270/403* (2013.01); *B60T 2270/415* (2013.01)

(58) Field of Classification Search
  CPC ......... B60T 2270/402; B60T 2270/403; B60T 2270/415; B60T 2240/00; B60T 2270/10; B60T 13/74; B60T 13/66; B60T 2270/84; B60R 16/0315
  See application file for complete search history.

(56) References Cited

U.S. PATENT DOCUMENTS

| | | | |
|---|---|---|---|
| 2011/0015844 | A1 | 1/2011 | Perkins et al. |
| 2013/0282249 | A1 | 10/2013 | Heise et al. |
| 2018/0065611 | A1 | 3/2018 | Matsuura |
| 2019/0176789 | A1 | 6/2019 | Frenzel et al. |
| 2019/0344762 | A1 | 11/2019 | Alfter et al. |
| 2020/0023823 | A1 | 1/2020 | Baehrle-Miller et al. |
| 2020/0070788 | A1 | 3/2020 | Michels et al. |
| 2021/0070269 | A1 | 3/2021 | Passmann |
| 2021/0146900 | A1* | 5/2021 | Einig .................. B60T 13/662 |
| 2021/0253075 | A1 | 8/2021 | Friedrich et al. |
| 2023/0126121 | A1* | 4/2023 | Brenn ................... B60T 7/122 701/70 |

FOREIGN PATENT DOCUMENTS

| | | |
|---|---|---|
| CN | 107757593 A | 3/2018 |
| CN | 109843673 A | 6/2019 |
| CN | 110281896 A | 9/2019 |
| CN | 110494333 A | 11/2019 |
| CN | 209870362 | 12/2019 |
| DE | 102007029910 A1 | 9/2008 |
| DE | 112016001537 T5 | 1/2018 |
| DE | 102016012530 A1 | 4/2018 |
| DE | 102018205811 A1 | 10/2018 |
| DE | 102017222484 A1 | 6/2019 |
| DE | 102017012130 A1 | 7/2019 |
| DE | 102018211298 A1 | 1/2020 |
| DE | 102018125308 A1 | 4/2020 |
| EP | 2977282 A1 | 1/2016 |
| KR | 101940364 B1 | 1/2019 |

OTHER PUBLICATIONS

WO document No. WO 2019/197555 to Alford et al published on Oct. 17, 2019.*
Office action dated Feb. 28, 2024; of the counterpart Korean application 10-2022-7026621.
German Search Report dated Oct. 21, 2020 for the counterpart German Patent Application No. 10 2020 202 920.3.
The International Search Report and the Written Opinion of the International Searching Authority mailed on Mar. 9, 2021 for the counterpart PCT Application No. PCT/EP2020/086010.
Notice of Allowance dated Dec. 27, 2024 for the counterpart Korean Patent Application No. 10 2022 7026621 and machine translation of same.
Office action dated Oct. 26, 2024 for the counterpart Korean application 10-2022-7026621 and machine translation of same.
Chinese First Office Action dated Sep. 25, 2023 for the counterpart Chinese Patent Application No. 202080097744.3 and translation of same.

* cited by examiner

BRAKING SYSTEM HAVING A REDUNDANT PARKING BRAKE FUNCTION

CROSS-REFERENCE TO RELATED APPLICATIONS

The present application is a National Stage Application under 35 U.S.C. § 371 of International Patent Application No. PCT/EP2020/086010 filed on Dec. 14, 2020, and claims priority from German Patent Application No. 10 2020 202 920.2 filed on Mar. 6, 2020, in the German Patent and Trademark Office, the disclosures of which are herein incorporated by reference in their entireties.

TECHNICAL FIELD

The invention relates to a braking system for a motor vehicle having a plurality of hydraulic brake units.

BACKGROUND

Such a braking system also has a first control device which comprises a first hydraulic controller which is designed and set up to drive the plurality of hydraulic brake units. For this purpose, the first hydraulic controller can, in particular, drive an associated valve device and a pressure build-up device which increases a hydraulic pressure in the hydraulic brake units in order to generate a braking force.

In order to reliably prevent the vehicle from rolling away, state-of-the-art vehicles have not only a parking brake but also a transmission pawl which can hold the vehicle stationary in the long term. If a single component of the control device of the parking brake actuators fails, such as the microprocessor, the power supply or the driver, neither of the parking brake calipers is available any longer. However, the vehicle is still safely held stationary by the transmission pawl. However, the cost of such a transmission pawl is high. Especially in the course of electrification of vehicles, transmissions are adapted to the requirements of the electric motors used, with it being possible to save significant costs in the entire combination by dispensing with the transmission pawl.

Simply dispensing with the transmission pawl is highly risky for the above reasons since the vehicle could roll away in an uncontrolled manner if the parking brake calipers fail.

SUMMARY

A braking system which, without the provision of a transmission pawl, redundantly and therefore reliably prevents the vehicle from rolling away in an uncontrolled manner is provided.

A first control device comprises a driver for driving the first parking brake actuator and a second control device with a driver for driving the first parking brake actuator and a driver for driving the second parking brake actuator. The two control devices can have independent power supplies here.

Such an architecture provides redundancy in terms of the parking brake functionality. If the first control device fails, the second control device can drive both parking brake actuators in order to prevent the motor vehicle from rolling away, even on steep slopes. This also results in redundancy for the deceleration of a moving vehicle. If the first control device with the hydraulic controller fails, the vehicle can be safely braked via two wheels via the second control device with the two connected parking brake actuators. If the second control device fails, the first control device can drive one parking brake actuator, which is already adequate to prevent the motor vehicle from rolling away on small inclines. In order to prevent the vehicle from rolling away even on steep slopes, the first control device can additionally drive the hydraulic brake units in order to generate additional braking force. This ensures that the vehicle is stationary in both possible fault cases, which means that the transmission pawl can be dispensed with.

In one embodiment, the first control device does not comprise a driver for driving the second parking brake actuator. The first control device therefore has no possible way of driving the second parking brake actuator. By saving on this drive function, the cost of the braking system can be reduced and its complexity can be minimized.

In a further embodiment, the second control device has reduced access to the plurality of hydraulic brake units compared to the first control device. Here, access is understood to mean the possible ways of driving the hydraulic brake units. The cost of the braking system can be reduced and the complexity of the braking system can also be minimized by minimizing the possible ways of accessing the hydraulic brake units.

In another embodiment, the second control device has no access to the hydraulic brake units at all. In particular, the second control device does not have a hydraulic controller which could allow pressure to build up in the hydraulic brake units. This embodiment is therefore cost-effective in respect of manufacture.

In an alternative embodiment, the second control device has a second hydraulic controller which is designed and set up to drive a number of hydraulic brake units which is less than the number of hydraulic brake units that can be driven by the first hydraulic controller. For example, the braking system can comprise four hydraulic brake units, each of which is assigned to one of four wheels of the motor vehicle. While the first hydraulic controller allows pressure to build up in all four hydraulic brake units, the second hydraulic controller is only designed and set up to drive two hydraulic brake units. To this end, it can, for example, drive its own pressure build-up device and corresponding valves.

In another embodiment, the second hydraulic controller is designed and set up to drive hydraulic brake units of a front axle of the motor vehicle, and the first and the second electric parking brake actuator are arranged on a rear axle of the motor vehicle. Both control devices are therefore able to brake both the wheels on the front axle and on the rear axle of the motor vehicle due to corresponding access to the connected brake units and actuators.

In a further embodiment, when both control devices are available, only the second control device is responsible for driving the parking brake actuators and a parking brake request is implemented by the first control device if the second control device fails or has a fault. The first control device and the second control device can be connected via a communication line in order to exchange availability information. A separate communication line or a vehicle bus can be used as the communication line.

In another embodiment, the first parking brake actuator and the hydraulic brake unit are driven by the first control device in order to implement the parking brake request. For this purpose, the parking brake actuator is accordingly applied and pressure is built up in the hydraulic brake unit. The braking forces from the hydraulic brake unit and the parking brake actuator are therefore added together in order to ensure that the motor vehicle is held securely.

In another embodiment, authorization to drive the first parking brake actuator is transferred by a token being exchanged between the first control device and the second control device. Only the control device that has the token can drive the parking brake actuator. This prevents a fault, in particular a short circuit, from occurring as a result of simultaneous, in particular contradictory, driving. The token can then be transferred as soon as a fault is established in the second control device, in the drive path or in one of the two parking brake actuators. The control device with the token drives the first parking brake actuator as if it were the only control device in the combination.

For example, the first and/or the second control device can be set up to drive the first parking brake actuator only when the control device itself has the token and the other control device does not have the token. This ensures that only one of the two control devices can be active at a time, while the other control device cannot perform any activity. For example, possible overlaps when transferring the token are therefore avoided since access can only take place as soon as the transfer of the token has been completed. This prevents a short circuit from occurring, for example, when a command to apply the parking brake (apply request) is made by the first control device and at the same time a command to release it (release request) is made by the second control device.

For example, during a switch-on process, for example start-up of the control devices after switching on the ignition of the motor vehicle, the first or the second control device receives the token which authorizes driving of the parking brake actuator which is connected to the first and the second control device in a drivable manner. Accordingly, the other control device does not receive a token. Therefore, it is clearly defined right from the start which of the control devices is allowed to access the parking brake actuators.

In another embodiment, a circuit breaker is arranged in each case between the first parking brake actuator and the drivers for driving the first parking brake actuator of the first control device and the second control device. The circuit breakers can be used to isolate the control devices from the first parking brake actuator in order to avoid crosstalk of faults between the two parking brake actuators and also in order to avoid crosstalk of voltage differences. This also prevents a fault in the parking brake actuator from damaging the control device.

In another embodiment, only the circuit breaker whose associated control device has the token is ever closed. Therefore, the other control device, which is kept available for reasons of redundancy, is protected against possible interference, so that this control device is ready for use in the event of a fault.

In a further embodiment, the second control device is set up to implement or to supplement a service brake function for decelerating the motor vehicle using the parking brake actuators if the first control device and/or at least one of the hydraulic brake units fail/fails or have/has a fault, and therefore to form a fallback level for the service brake. The deceleration by means of the two parking brake actuators can be initiated here when a brake pedal or a parking brake switch is pressed or an automatic deceleration is triggered, for example by an internal pressure sensor of the hydraulics. Owing to the architecture, it is not only possible to ensure redundancy in the parking brake functions, but also redundancy in the service brake. If the hydraulic brake units can no longer be fully driven in order to ensure that the motor vehicle is decelerated, the parking brake actuators are therefore used to generate a braking torque.

In a further embodiment, the braking system further comprises four wheel speed sensors which are connected to the second control device in such a way that the signals from the four wheel speed sensors can be transmitted to the second control device, wherein a multiplexer is also provided, which is set up to switch over the signals from two wheel speed sensors to the first control device. The multiplexer can be arranged on the first or the second control device and is switched such that two of the four wheel speed sensors are electrically connected to the other control device in the event of a fault scenario or operation with no current flowing. Therefore, during normal operation, all four wheel speed sensors can be connected directly to the second control device, on which the driving stability functions are implemented, for example. If this control device fails, the remaining control device requires reliable information as to whether the vehicle is stationary. Application of the parking brake actuators while driving is generally to be prevented for reasons of driving stability. Since the operating mode of the fallback level in which the parking brake actuators are driven by the first control device occurs sufficiently infrequently, the use of two instead of four wheel speed sensors is adequate here.

In a further embodiment, the second control device is set up to carry out slip-controlled braking by means of the two parking brake actuators taking into account the signals from the four wheel speed sensors. Therefore, slip-controlled braking can also be carried out in the fallback level of the service brake when a service brake function is carried out using the parking brake actuators.

A motor vehicle may have a front axle and a rear axle and a braking system as described above.

BRIEF DESCRIPTION OF THE DRAWINGS

The present disclosure will become more fully understood from the detailed description and the accompanying drawings, wherein.

DETAILED DESCRIPTION

Figure 1:
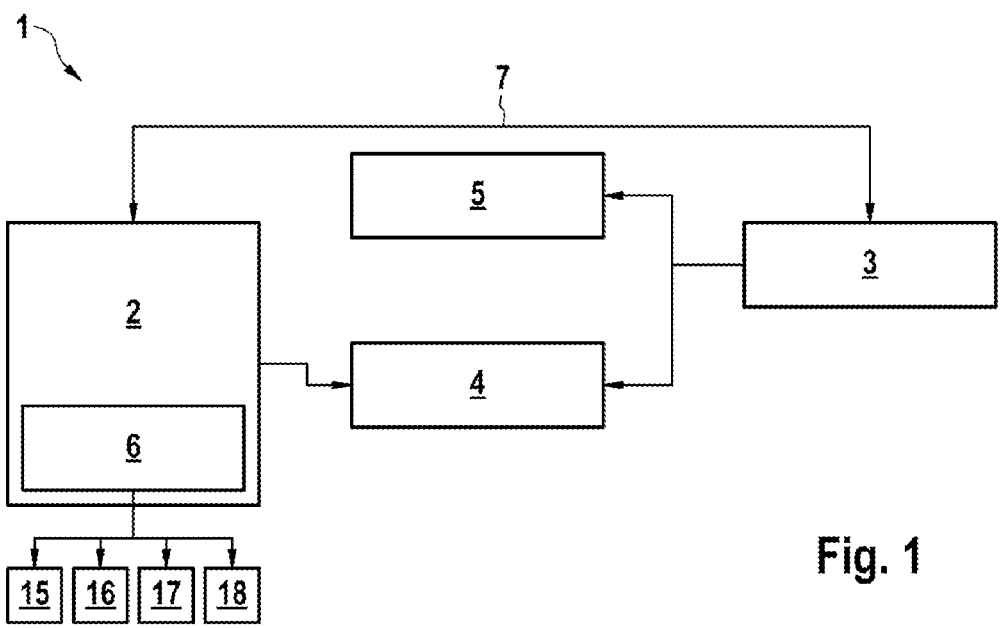
FIG. 1 shows a schematic illustration of a first embodiment of a braking system.

The embodiment illustrated in FIG. 1 has a first control device 2, which is embodied as a main control device (main ECU), and a hydraulic controller 6 for driving hydraulic brake units 15, 16, 17, 18. The hydraulic controller 6, together with the hydraulic brake units 15, 16, 17, 18, forms the service brake of a motor vehicle 10, which service brake decelerates the motor vehicle 10 when a brake pedal is actuated. The first control device 2 can initiate, for example, a build-up of pressure in the hydraulic brake units 15, 16, 17 via the hydraulic controller 6. Furthermore, the first control device 2 is set up to drive a first electronic parking brake (EPB) with a corresponding parking brake actuator 4 and is connected to said parking brake actuator. The first control device 2 has no direct connection to the second electronic parking brake with the second parking brake actuator 5 in order to drive it.

The second control device 3, on the other hand, is connected to the two electronic parking brakes with the associated parking brake actuators 4, 5 and is set up to drive the two parking brake actuators 4, 5. The second control device 3 does not have its own hydraulic controller, which would enable hydraulic brake units 15, 16, 17, 18 to be driven. The second control device 3 also has no connection to the hydraulic controller 6 of the first control device, which would enable access to the hydraulic brake units 15, 16, 17, 18.

A communication line 7 connects the first control device 2 to the second control device 3 in order to guarantee reliable communication between the two control devices 2, 3. The communication line 7 is designed as a separate communication line 7.

Figure 2:
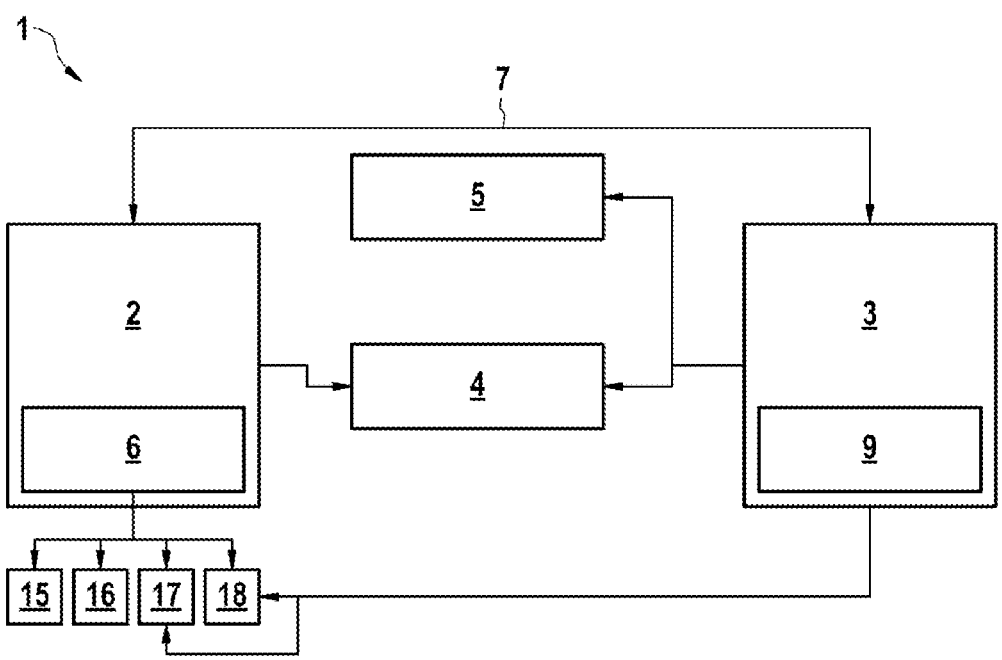
FIG. 2 shows a schematic illustration of a second embodiment of the braking system.

The alternative embodiment, as illustrated in FIG. 2, likewise has a first control device 2 which is constructed and connected in an equivalent manner to FIG. 1. However, the second control device 3 in FIG. 2 likewise has a hydraulic controller 9 which is set up to drive the hydraulic brake units 17, 18. The second control device 3 therefore has reduced access to the plurality of hydraulic brake units 15, 16, 17, 18 compared to the first control device 2.

Figure 3:
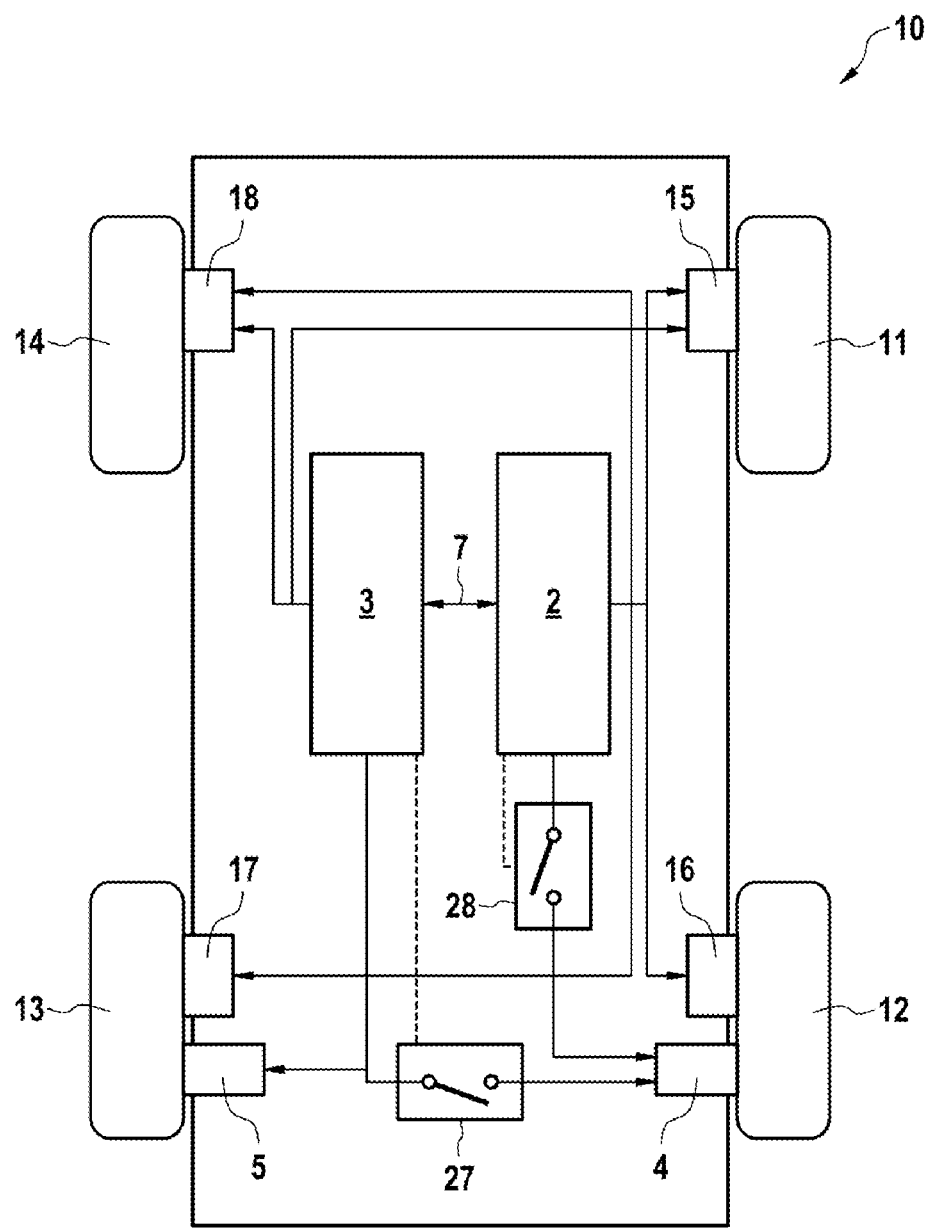
FIG. 3 shows a motor vehicle with a braking system according to FIG. 2.

FIG. 3 shows a motor vehicle 10 with a front axle with a right-hand-side front wheel 11 which can be braked by a hydraulic brake unit 15 and a left-hand-side front wheel 14 which can be braked by a hydraulic brake unit 18. A right-hand-side rear wheel 12 which can be braked by a hydraulic brake unit 16 is arranged on a rear axle of the vehicle 10 and a hydraulic brake unit 17 is arranged on a left-hand-side rear wheel 13 of the rear axle in order to brake said wheel. Furthermore, a parking brake actuator 5 is arranged on the left-hand-side rear wheel 13 and a parking brake actuator 4 is arranged on the right-hand-side rear wheel 12, the two rear wheels 12, 13 and therefore the vehicle 10 being able to be held stationary by way of said parking brake actuators.

FIG. 3 furthermore shows the first control device 2 and the second control device 3 which are connected to one another via a communication line 7. The first control device 2 is set up to build up brake pressures in the hydraulic brake units 15, 16, 17, 18 and has corresponding connections to the respective hydraulic brake units 15, 16, 17, 18, which are illustrated in a simplified functional manner in FIG. 3. These connections can be hydraulic connections which are provided with appropriate valve devices and are connected to a pressure build-up device, such as a hydraulic pump or a linear actuator for example. Valve devices and the pressure build-up device can be driven by the control device.

The second control device 3 is set up to build up brake pressures in the hydraulic brake units 15 and 18 on the two wheels 11, 14 of the front axle and has corresponding connections, which are likewise illustrated only in a simplified functional manner.

The first control device 2 also has a connection to the first parking brake actuator 4 on the right-hand-side rear wheel 12 in order to drive this parking brake actuator 4. The connection between the control device 2 and the parking brake actuator 5 is disconnected by a circuit breaker 28 which can be switched by the first control device 2.

The second control device 3 is likewise connected to the first parking brake actuator 4 via a circuit breaker 27 which can be switched by the second control device 3. The second control device 3 is also connected to the second parking brake actuator 5. Since the second parking brake actuator 5 is connected only to the second control device 3, a circuit breaker is not required.

The circuit breakers 27, 28 can also be part of the first or the second control device 2, 3 and can open and close both wires of the respective actuator connection.

During operation without faults, when both control devices 2, 3 are fully available, a service brake function is provided by the first control device 2. When a braking request is made, for example by pressing a brake pedal or by an automatic function, such as adaptive cruise control (ACC) or an emergency braking function for example, a corresponding brake pressure is built up in the four hydraulic brake units 15, 16, 17, 18 by the first control device 2. Driving of the hydraulic brake units 15 and 18 by the second control device 3 is not used in this case.

Once the vehicle 10 has been parked, a parking brake request may be made, for example by pressing a corresponding parking brake switch or by an automatic condition. The second control device 3 then drives the parking brake actuator 4 and the parking brake actuator 5 in such a way that they apply the parking brake in order to generate a braking force in the rear wheels 12, 13. In this case, the circuit breaker 27 is closed by being driven by the second control device 3 and therefore connects the parking brake actuator 4 to the second control device 3. In contrast, driving of the first parking brake actuator 4 by the first control device 2 is not used and the circuit breaker 28 is opened by driving by the first control device 2 and therefore does not establish a connection to the parking brake actuator 4. This also prevents the switching output of the second control device 3 from being connected to the switching output of the first control device 2 via the connection at the parking brake actuator 4.

In the event of a fault, for example if the first control device 2 fails, the unavailability of the first control device 2 is transmitted to the second control device 3 via the communication line 7. The second control device 3 therefore forms the fallback level of the service brake. When a braking request to decelerate the vehicle 10 is made, the second control device 3 can drive the hydraulic brake units 15, 18 of the front axle. The second control device 3 uses the electromechanical parking brake actuators 4, 5 to brake the rear axle. Therefore, all 4 wheels 11, 12, 13, 14 of the vehicle 10 can also be braked in the fallback level of the service brake in order to ensure that the vehicle 10 is safely decelerated.

If the second control device 3 fails, the unavailability of the second control device 3 is likewise communicated to the first control device 2 via the communication line 7. Furthermore, a token to authorize driving of the first parking brake actuator 4 is transferred. Due to the second control device 3 failing, in extreme cases this control device can no longer output a signal to open the circuit breaker 27. However, the circuit breaker 27 is connected such that it opens with no current flowing and is therefore opened automatically due to the second control device 3 failing. The first control device 2 receives the token for authorization to drive the first parking brake actuator 4 and closes the circuit breaker 28 between the first control device 2 and the first parking brake actuator 4 and therefore establishes a connection. When a parking brake request is made, the first parking brake actuator 4 is driven by the first control device 2 and furthermore a brake pressure is generated in the hydraulic brake units 15, 16, 17, 18 in order to compensate for the second parking brake actuator 5 not being driven and therefore to generate a sufficiently high holding force. As an alternative, the first control device 2 may drive only the hydraulic brake unit 17 which is arranged on the left-hand-side rear wheel 13. Therefore, the first control device 2 drives only the hydraulic brake unit 17 which is associated with the same wheel 13 as the electric parking brake actuator 5 that cannot be driven by the first control device 2.

Figure 4:
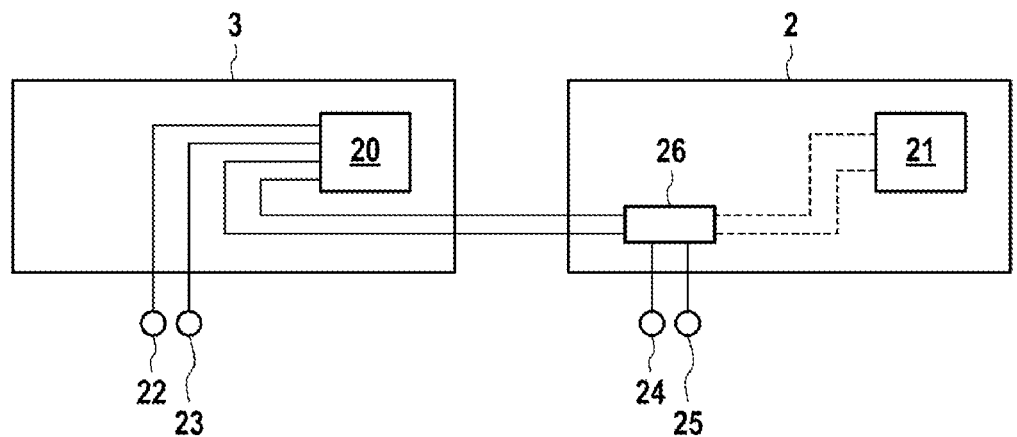
FIG. 4 shows the distribution of the wheel speed sensor signals of one embodiment.

Wheel speed signals 22, 23, 24, 25, which provide information about the rotational speed of the wheels 11, 12, 13, 14, are required to implement driving stability functions and slip-controlled braking. In the embodiment of FIG. 4, a multiplexer 26 is arranged on the first control device 2. Said multiplexer receives the signal from the wheel speed sensor 24 of the right-hand-side front wheel 11 and the signal from the wheel speed sensor 25 of the left-hand-side rear wheel 13. In the state without faults, the multiplexer 26 passes on the signals from the wheel speed sensors 24, 25 to the second control device 3 and to a functional unit 20 located there for implementing driving stability functions. The signals from the wheel speed sensor 22 of the left-hand-side front wheel 14 and the signals from the wheel speed sensor 23 of the right-hand-side rear wheel 12 are connected to the second control device 3 and directly to the functional unit 20 for implementing driving stability functions. The multiplexer 26 is switched in such a way that it passes on the signals from the wheel speed sensors 24, 25 to the second control device 3 even if the first control device 2 fails. If the second control device 3 fails, the multiplexer 26 switches over and transmits the signals from the wheel speed sensors 24, 25 to a functional unit with the fallback level of the driving stability function.

Figure 5:
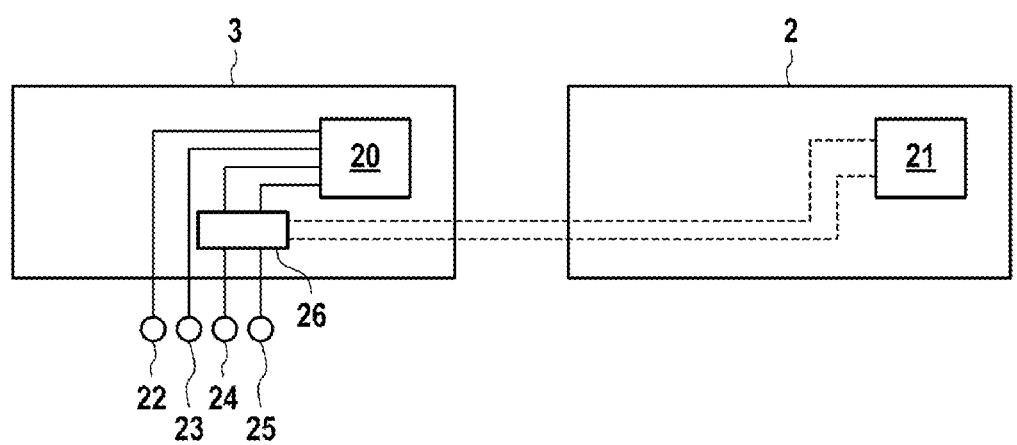
FIG. 5 shows the distribution of the wheel speed sensor signals of a further embodiment.

FIG. 5 shows an alternative embodiment in which the signals from the wheel speed sensors 22, 23, 24, 25 are all transmitted to the second control device 3. The wheel speed sensors 22, 23 are connected directly to the functional unit 20 for implementing the driving stability function. The wheel speed sensors 24, 25, on the other hand, are connected to the functional unit 20 via a multiplexer 26, which in this embodiment is arranged on the second control device. If the second control device fails, the multiplexer 26 switches over the signals from the wheel speed sensors 24, 25 and communicates them to the first control device 2 to a functional unit 21 for implementing the fallback level of the stability functions.

The braking system therefore offers fallback levels both for the service brake and for the parking brake functions in order to ensure the vehicle is safely braked and remains stationary in all cases.

The invention claimed is:
1. A braking system for a motor vehicle comprising:
a plurality of hydraulic brake units each braking one wheel of the motor vehicle;
a first electric parking brake actuator for braking a first wheel;
a second electric parking brake actuator for braking a second wheel;
a first control device which comprises a first hydraulic controller which is designed and set up to drive the plurality of hydraulic brake units wherein the first control device comprises a first driver for driving the first parking brake actuator wherein the first control device does not comprise a driver for driving the second parking brake actuator; and
a second control device, which comprises a second driver for driving the first parking brake actuator and a third driver for driving the second parking brake actuator.
2. The braking system as claimed in claim 1, wherein the second control device has reduced access to the plurality of hydraulic brake units compared to the first control device.
3. The braking system as claimed in claim 2, wherein the second control device has no access to the hydraulic brake units.
4. The braking system as claimed in claim 2, wherein the second control device comprises a second hydraulic controller which is designed and set up to drive a portion of the plurality of hydraulic brake units which is less than a number of the plurality of hydraulic brake units that can be driven by the first hydraulic controller.
5. The braking system as claimed in claim 4, wherein the second hydraulic controller is designed and set up to drive hydraulic brake units of a front axle of the motor vehicle, and the first and the second electric parking brake actuator are arranged on a rear axle of the motor vehicle.
6. The braking system as claimed in claim 1, wherein when the first and the second control devices are available, only the second control device drives the parking brake actuators when a parking brake request is made, and a parking brake request is implemented by the first control device if the second control device fails or has a fault.
7. The braking system as claimed in claim 6, wherein the first parking brake actuator and at least one hydraulic brake unit are driven for the purpose of implementing the parking brake request.
8. The braking system as claimed in claim 1, wherein authorization to drive the first parking brake actuator is transferred by a token being exchanged between the first control device and the second control device.
9. The braking system as claimed in claim 1, wherein a circuit breaker is arranged in each case between the first parking brake actuator and the drivers for driving the first parking brake actuator of the first control device and the second control device.
10. The braking system as claimed in claim 9, wherein only the circuit breaker whose associated control device has a token is ever closed.
11. The braking system as claimed in claim 1, wherein the second control device is set up to implement or to supplement a service brake function for decelerating the moving motor vehicle using the parking brake actuators if the first control device and/or at least one of the hydraulic brake units fail/fails or have/has a fault.
12. A braking system for a motor vehicle comprising:
a plurality of hydraulic brake units each braking one wheel of the motor vehicle;
a first electric parking brake actuator for braking a first wheel;
a second electric parking brake actuator for braking a second wheel;
a first control device which comprises a first hydraulic controller which is designed and set up to drive the plurality of hydraulic brake units wherein the first control device comprises at least a first driver for driving the first parking brake actuator and for driving the second parking brake actuator;
a second control device, which comprises at least one second driver for driving the first parking brake actuator and for driving the second parking brake actuator
four wheel speed sensors connected to the second control device such that the signals from the four wheel speed sensors can be transmitted to the second control device; and
a multiplexer set up to switch over the signals from two of the four wheel speed sensors to the first control device.
13. The braking system as claimed in claim 12, wherein the second control device is set up to carry out slip- controlled braking with the two parking brake actuators taking into account the signals from the four wheel speed sensors.

14. The braking system as claimed in claim 12, wherein the at least one first driver further comprises a first driver and a second driver.

15. The braking system as claimed in claim 12, wherein the at least one second driver further comprises a third driver and a fourth driver.

16. A motor vehicle comprising:
   a front axle;
   a rear axle; and
   a braking system having:
   a plurality of hydraulic brake units each braking one wheel of the motor vehicle;
   a first electric parking brake actuator for braking a first wheel;
   a second electric parking brake actuator for braking a second wheel;
   a first control device which comprises a first hydraulic controller which is designed and set up to drive the plurality of hydraulic brake units wherein the first control device comprises a first driver for driving the first parking brake actuator wherein the first control device does not comprise a driver for driving the second parking brake actuator; and
   a second control device, which comprises a second driver for driving the first parking brake actuator and a third driver for driving the second parking brake actuator.

17. The motor vehicle as claimed in claim 16, wherein the second control device has reduced access to the plurality of hydraulic brake units compared to the first control device.

18. The motor vehicle as claimed in claim 17, wherein the second control device has no access to the hydraulic brake units.

19. The motor vehicle as claimed in claim 17, wherein the second control device comprises a second hydraulic controller which is designed and set up to drive a portion of the plurality of hydraulic brake units which is less than a number of the plurality of hydraulic brake units that can be driven by the first hydraulic controller.

20. The motor vehicle as claimed in claim 19, wherein the second hydraulic controller is designed and set up to drive hydraulic brake units of the front axle, and the first and the second electric parking brake actuator are arranged on the rear axle.

* * * * *